Aug. 14, 1934.   V. H. BODLE ET AL   1,969,962
METHOD OF MAKING A RUBBER ARTICLE HAVING A MOLDED OUTER SURFACE
Filed March 12, 1932
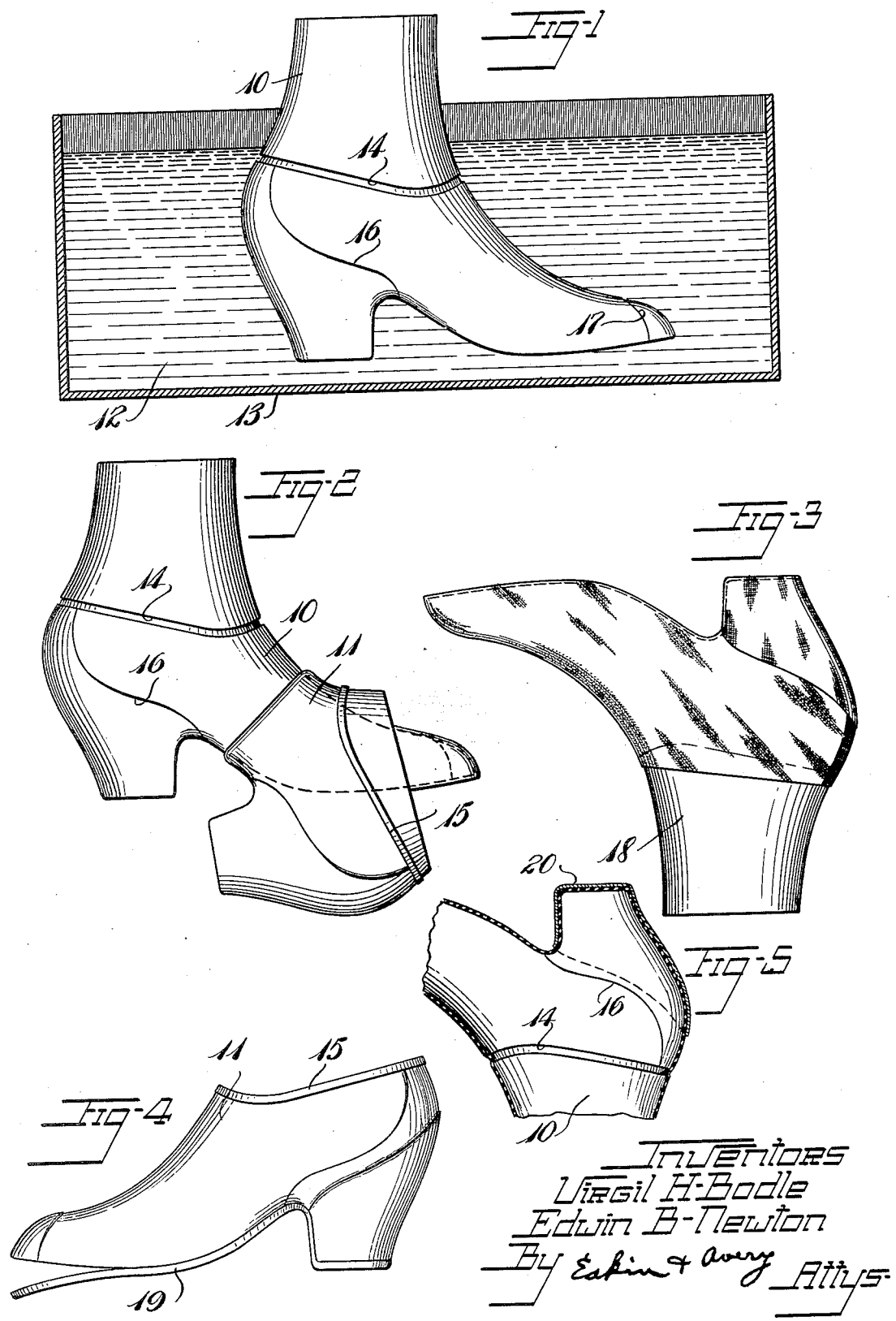

UNITED STATES PATENT OFFICE 1,969,962

METHOD OF MAKING A RUBBER ARTICLE HAVING A MOLDED OUTER SURFACE

Virgil H. Bodle, Newton, Mass., and Edwin B. Newton, Akron, Ohio, assignors to The B. F. Goodrich Company, New York, N. Y., a corporation of New York Application March 12, 1932, Serial No. 598,418

8 Claims. (Cl. 18—58)

This invention relates to methods for making a rubber article having a molded outer surface, an article of rubber footwear being chosen for purposes of illustration herein.

Our chief objects are conveniently to provide an article such as a rubber shoe, for example, having a molded surface design; to provide an article of the character described having an extensive rubber element of complex form and integrally molded; and to provide finished rubber articles such as shoes with fewer manufacturing steps and less expensive equipment than heretofore have been required for similar articles.

Of the accompanying drawing:

Fig. 1 is a vertical section of a tank of rubber-containing liquid and a shoe last therein embodying and adapted for the practice of our invention.

Fig. 2 is an elevation of the last and a deposit of rubber in the process of being removed therefrom.

Fig. 3 is an elevation of an inverted shoe-building last and parts of a shoe thereon, illustrating a step in the practice of our invention in its preferred form.

Fig. 4 is an elevation of the finished product, a part of the out-sole being pulled away from the rest of the shoe to illustrate a permissible feature of the process.

Fig. 5 is a fragmentary elevation of the last of Figs. 1 and 2 with a rubber deposit and a heel reinforcement thereon, illustrating an alternative step in the procedure, parts being shown in section.

Referring to the drawing, 10 is a form, preferably of metal, having its surface formed as the negative of the outer surface of the rubber shoe to be produced, the form being adapted to have a layer of rubber 11 deposited thereon by dipping it in a bath 12, in a tank 13, of an aqueous or solvent dispersion of rubber, preferably latex, to form a rubber upper to be used in the production of the finished shoe.

The particular form here shown has, for example, an annular groove 14 around its upper portion to form an annular rib 15 (Fig. 2 or 4) upon the inner face of the rubber layer 11 and has offsets in its surface contour, represented by the lines 16, 17, respectively, to provide on the inner face of the rubber layer lines or shoulders representing the outlines of heel and toe reinforcements.

In case a natural or artificial aqueous dispersion of rubber is used for the bath 12, the deposition of the rubber upon the form may be expedited by applying a coagulant to the form or the rubber already deposited thereon, or by heating it, before each dipping of the form in the bath, or a sufficiently thick layer may be built up by dipping it a number of times and wholly or partially drying each deposit of rubber before the next dipping, and a layer of varying thickness may be obtained, if desired, by dipping one part of the form more times than another, or by varying the disposition of the coagulant, or by other procedure that will naturally occur to those skilled in the art, and other procedures for providing the layer of rubber intimately conforming to the surface of the form may be resorted to.

When the desired layer has been provided it is dried, if any substantial quantity of liquid is contained in the rubber, and it is then stripped from the form 10, as is illustrated in Fig. 2, and turned inside out.

It is then mounted in its reversed condition upon a shoe-building last of the usual shape, such as the last 18 of Fig. 3, which may have built thereon fabric inner shoe parts such as are there shown, and then, either with or without the addition of a calendered or other rubber outsole 19 (Fig. 4), the assembly is subjected to vulcanizing heat and, preferably, to substantial external fluid pressure.

The excess rubber is then trimmed off about the upper edge of the shoe, represented in this instance by the rib 15, providing the finished article illustrated in Fig. 4, the outsole being partly pulled away in this figure, however, to illustrate the construction where a separate outsole is applied while the rubber upper is on the last 18.

Alternatively, fabric reinforcements or calendered rubber parts may be applied to the initially outer surface of the rubber layer or deposit, or between successive individual layers of the deposit, before the deposit is removed from the form 10, as illustrated by the fabric heel reinforcement 20 in Fig. 5, and the composite structure then removed from the form and mounted, inside out, upon a bare last for vulcanization.

The invention conveniently provides, without expensive equipment, a rubber facing member or upper having a molded outer face, which may be of intricate design, and, while not limited to the production of a complete upper, it may be employed to provide an integral, impervious layer extending throughout the entire shoe, including the sole and heel portions.

Various modifications other than those herein described may be resorted to without departure from the scope of the invention as defined in the appended claims.

We claim:

1. The method of making an article of footwear having a molded rubber outer face which comprises molding a layer of rubber against an irregularly configured form and thereby producing an irregular molded surface configuration, removing the layer from the form and mounting it inside out upon a footwear last, and vulcanizing it upon said last.

2. The method of making an article of footwear having a molded rubber outer face which comprises depositing rubber upon an irregularly configured form from a liquid dispersion of rubber and thereby producing an irregular molded surface configuration, mounting the deposit inside out upon a footwear last, and vulcanizing it upon the last.

3. The method of making an article of footwear having a molded rubber outer face which comprises depositing rubber upon an irregularly configured form from a liquid dispersion of rubber and thereby producing an irregular molded surface configuration, drying the rubber, and then removing the deposit from the form and mounting it inside out upon a footwear last, and vulcanizing it upon the last, a footwear lining being associated with and vulcanized to the rubber.

4. The method of making a rubber article having a molded outer face which comprises depositing a layer of rubber upon an irregularly configured form from a liquid dispersion of rubber and thereby producing an irregular surface configuration and then turning the layer inside out, a reinforcement being associated with and vulcanized to the rubber layer.

5. The method of making a rubber article having a molded outer face which comprises molding a layer of rubber against a form, then applying a reinforcement to the rubber layer, then removing the resulting structure from the form and mounting it inside out upon a support, and vulcanizing it upon the support.

6. The method of making a rubber article which comprises depositing a layer of rubber upon a form from a liquid dispersion of rubber, then applying a reinforcement to the rubber layer, then turning the resulting structure inside out and then vulcanizing it.

7. The method of making a rubber article having a molded outer face which comprises molding a layer of rubber against an irregularly configured form and thereby producing an irregular molded surface configuration, removing the layer from the form and mounting it inside out upon a support, and vulcanizing it upon the support.

8. The method of making a rubber article having a molded outer face which comprises depositing rubber upon an irregularly configured form from a liquid dispersion of the rubber and thereby producing an irregular molded surface configuration, mounting the deposit inside out upon a support, and vulcanizing it upon the support.

VIRGIL H. BODLE.
EDWIN B. NEWTON.